(12) United States Patent
Mills et al.

(10) Patent No.: US 12,730,501 B2
(45) Date of Patent: Sep. 8, 2026

(54) HEAD TRACKING SYSTEM WITH INERTIAL MANAGEMENT UNIT FOR TRACKING HELMET ORIENTATION

(71) Applicant: BAE SYSTEMS PLC, London (GB)

(72) Inventors: Colin Richard Mills, Rochester (GB); Simon Trythall, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/874,914

(22) PCT Filed: Jun. 1, 2023

(86) PCT No.: PCT/GB2023/051453
§ 371 (c)(1),
(2) Date: Dec. 13, 2024

(87) PCT Pub. No.: WO2023/242533
PCT Pub. Date: Dec. 21, 2023

(65) Prior Publication Data

US 2025/0165062 A1 May 22, 2025

(30) Foreign Application Priority Data

Jun. 13, 2022 (EP) .................................... 22275077
Jun. 13, 2022 (GB) ..................................... 2208577

(51) Int. Cl.
*G06F 3/01* (2006.01)
*G02B 27/00* (2006.01)
*G06F 3/03* (2006.01)

(52) U.S. Cl.
CPC ......... *G06F 3/012* (2013.01); *G02B 27/0093* (2013.01); *G06F 3/0304* (2013.01)

(58) Field of Classification Search
CPC ...................................................... G06F 3/012
See application file for complete search history.

(56) References Cited

U.S. PATENT DOCUMENTS 9,652,031 B1 * 5/2017 Savastinuk ........... G06F 3/0346
10,977,815 B1 * 4/2021 Chao ...................... G06T 7/521
(Continued)

FOREIGN PATENT DOCUMENTS

EP 2070974 A2 6/2009
EP 3073285 A1 9/2016
(Continued)

OTHER PUBLICATIONS

Extended European Search Report received for EP Application No. 22275077.0, dated Oct. 31, 2022. 11 pages.
(Continued)

*Primary Examiner* — Chun-Nan Lin
(74) *Attorney, Agent, or Firm* — Arcane Law PLLC

(57) ABSTRACT

A head tracking system HTS configured to determine a head position and/or a head orientation of a user includes one or more optical sensors producing optical measurements; and one or more inertial sensors producing inertial measurements; a processor configured, when the optical sensors fail to provide optical measurements to determine the head location and the head orientation of a user, to operate in a coasting mode using the inertial measurements from the one or more inertial sensors to determine the head location and the head orientation of a user.

21 Claims, 5 Drawing Sheets

(56) References Cited

U.S. PATENT DOCUMENTS

| | | | | |
|---|---|---|---|---|
| 2014/0066816 | A1 * | 3/2014 | McNames | A61B 5/6831<br>600/595 |
| 2017/0131765 | A1 * | 5/2017 | Perek | G06F 3/0304 |
| 2019/0041980 | A1 | 2/2019 | Trythall et al. | |
| 2021/0300587 | A1 * | 9/2021 | Alberda | G01C 21/165 |
| 2022/0160439 | A1 * | 5/2022 | Ryan | A61B 34/20 |

FOREIGN PATENT DOCUMENTS

| | | | |
|---|---|---|---|
| GB | 2599145 | A1 | 3/2022 |
| JP | 2017142813 | A | 8/2017 |
| WO | WO2012091897 | A1 | 7/2012 |
| WO | WO2014011293 | A2 | 1/2014 |
| WO | WO2017079689 | A1 | 5/2017 |
| WO | WO2021083584 | A1 | 5/2021 |
| WO | WO2023242533 | A1 | 12/2023 |

OTHER PUBLICATIONS

GB Search Report under Section 17(5) received for GB Application No. 2211579.4, dated Mar. 14, 2023. 3 pages.

International Search Report and Written Opinion received for PCT Application No. PCT/GB2023/051453. Mail date: Sep. 5, 2023. 16 pages.

JP Office Action received for JP Application No. 2024-573363, (and translation) Mar. 6, 2026. 8 pages.

* cited by examiner

HEAD TRACKING SYSTEM WITH INERTIAL MANAGEMENT UNIT FOR TRACKING HELMET ORIENTATION

FIELD

The present invention relates to a head tracking system.

BACKGROUND

A head tracking system is used to determine where a user's head is orientated and positioned based on platform and/or head mounted sensors and/or emitters and/or references. The head orientation and position data can be used to align imagery presented within a head worn display with reference to the real and/or virtual world. The head orientation and/or position data can also be utilised by other platform systems to control sensors and/or other equipment. The head tracking is generally based on the position of the user's head (XYZ) and the orientation (yaw, pitch and roll).

Head tracking systems use single and sometimes multiple head tracking techniques operating together to enhance the head orientation and/or position data using a combination of optical and inertial measurements. When both are used, the system is referred to as hybrid tracking. Having access to optical and inertial measurements provides an element of redundancy which can be used to improve the integrity of the head tracker output.

In certain situations where one or other sets of orientation and/or position measurements are not received or give erroneous information the use of the head orientation and/or position could lead to a hazardous situation. In addition when relying on inertial measurements alone (which may be referred to as coasting) there is a tendency for errors to accumulate. When relying on optical measurements alone the head tracking system will be unavailable when no optical solution can be realised.

A need exists for a head tracking system which overcomes at least some of the risks of unavailable head tracking data or elevated errors i.e. to overcome at least some of the current issues with known head tracking systems.

SUMMARY

According to an aspect of the present invention, there is provided a head tracking system HTS, configured to determine a head position and/or a head orientation of a user, the HTS comprising: one or more optical sensors producing optical measurements; and one or more inertial sensors producing inertial measurements; a processor configured, when the optical sensors fail to provide optical measurements to determine the head location and the head orientation of a user, to operate in a coasting mode using the inertial measurements from the one or more inertial sensors to determine the head location and the head orientation of a user, the processor configured to further: determine a figure of merit FOM for coasting errors based on a combination of one or more of errors in an estimated inertial sensor bias, a random drift and noise of the inertial sensor and the inertial sensor gain and alignment errors; compare the FOM with a threshold to determine whether the inertial measurements provide a valid or invalid head location and/or head orientation; and determine a subsequent operation from a plurality of possible subsequent operations of the HTS based on whether the head location and/or head orientation is valid or invalid.

In an aspect, when the coasting error is less than the threshold the head location and/or head orientation is valid.

In an aspect, when the coasting error is greater than/or equal to the threshold the head location and/or head orientation is invalid.

In an aspect, the HTS further includes an action control module to determine which subsequent operations are available.

In an aspect, the possible subsequent operation comprises normal operation when the head location and/or head orientation is valid, or the operation does not need the position or orientation of a user.

In an aspect, the possible subsequent operation comprises limited operation when the head location and/or head orientation is invalid, and the operation does not need the position or orientation of a user In an aspect, the possible subsequent operation comprises declaring tracking invalid when the head location and/or head orientation is invalid, and the operation does need the position or orientation of a user.

In an aspect, the processor is configured to: determine the head position and/or the head orientation from one or both of the one or more optical sensors and the one or more inertial sensors; determine the head position and/or the head orientation from one or more inertial sensors if the optical measurements are invalid; determine the head position and/or the head orientation from one or more optical sensors if the inertial measurements are invalid.

In an aspect, determine a rate of changes of FOM to identify trends and potential risks.

In an aspect, the one or more inertial sensors comprise three or more gyroscopes located on a head worn assembly associated with the HTS.

In an aspect, the one or more optical sensors comprise cameras in the vicinity of the HTS being configured to receive optical measurements from one or more light elements located on a head worn assembly associated with the HTS.

In an aspect, an interface (118) is provided to receive aircraft orientation, aircraft position and associated latencies of the aircraft orientation and aircraft position data which is used in calculating the FOM.

In an aspect, the head tracking system is incorporated into a head worn display assembly such as a helmet.

According to a further aspect of the present invention there is provided a head worn display assembly configured to present images aligned with the outside world scene are to be presented real and virtual images to a user based on a head position and a head orientation provided by the HTS of another aspect.

In an aspect, an optical display to display the real and virtual images to a user wearing the head worn assembly is provided, wherein the presentation of at least the images is based on the FOM of the inertial measurements.

In an aspect, the optical display comprises at least one of a visor-projection display system, and a waveguide-based display, arranged to present virtual images such that they appear overlain through a visor of the head worn display.

According to a further aspect of the present invention there is provided a method to determine a head location and a head orientation of a user to which real and virtual images are to be presented using a head tracking system HTS configured to produce optical measurements and to produce inertial measurements, the method comprising: when there are no optical measurements using the inertial measurements to determine the head location and position: determining a figure of merit FOM for coasting errors based on a combination of one or more of errors in an estimated inertial sensor bias, a random drift and noise of the inertial sensor and the inertial sensor gain and alignment errors; comparing (348) the FOM with a threshold to determine whether the inertial measurements provide a valid or invalid head location and/or head orientation; and determining a subsequent operation from a plurality of possible subsequent operations of the HTS based on whether the head location and/or head orientation is valid or invalid.

In an aspect, determining the head location and/or head orientation is valid when the FOM is less than the threshold (406).

In an aspect, determining the head location and/or head orientation is invalid when the FOM is greater than/or equal to the threshold (408).

In an aspect, determining which subsequent operations are available via an action control module (410).

In an aspect, determining the possible subsequent operation to be a normal operation (414) when the head location and/or head orientation is valid, or the operation does not need the position or location of a user.

In an aspect, determining the possible subsequent operation to be a limited operation (416) when the head location and/or head orientation is invalid, and the operation does not need the position or location of a user.

In an aspect, determining the possible subsequent operation to be declaring tracking invalid (418) when the head location and/or head orientation is invalid, and the operation does need the position or location of a user.

In an aspect, determining a rate of changes of FOM (412) to identify trends and potential risks.

In an aspect, notify a vehicle control system when the head location and/or head orientation is invalid to enable the vehicle control system to reset head tracking.

BRIEF DESCRIPTION OF THE FIGURES

Embodiments of the invention will now be described by way of example only with reference to the figures, in which.

DETAILED DESCRIPTION

The present invention relates to a helmet tracking system (HTS). Hybrid helmet tracking systems that use helmet mounted inertial management unit(s) (IMUs) can be used to perform orientation tracking when the primary tracking source is not available. In the case of opto/inertial tracking systems, this is when the optical system is unable to provide an optical solution. This disclosure describes a method by which the error build up during tracking with only IMUs can be estimated. If, for example, the error goes above a certain value, this could be used to signal that the tracking output is invalid.

Orientation and accuracy degradation caused by the inertial measurement units (IMUs) which drift over time/temperature and other environmental factors limit the useable time of coasting which is a limiting factor in IMU only tracking. Coasting refers to the use of inertial-derived angular rate for short periods of time when the optical measurements are unavailable.

The present invention provides an estimate of the angular error during coasting. This estimate can be used internally by the helmet tracking system, external systems or the user to determine if the can tracking data is sufficiently accurate to be used.

Figure 1:
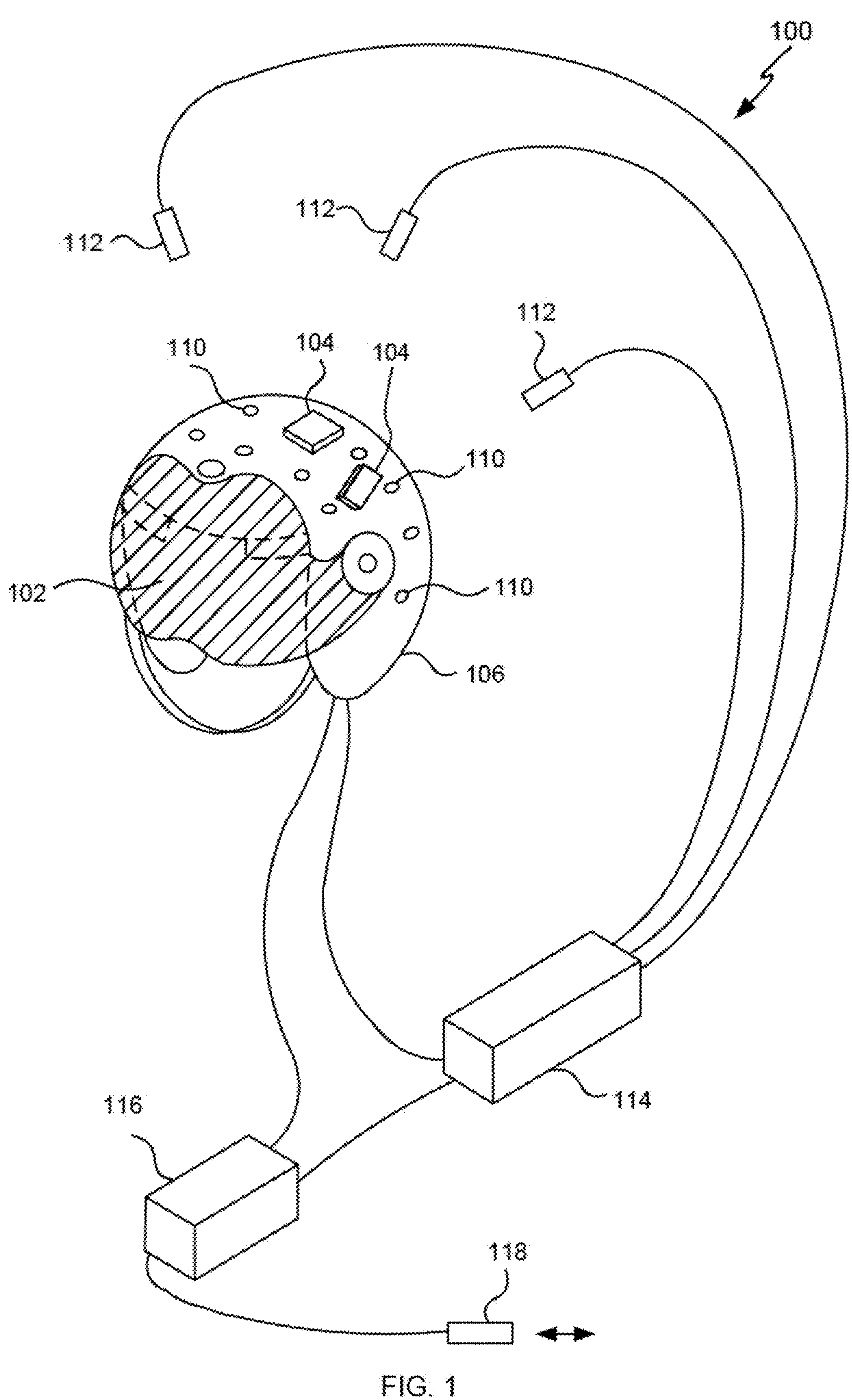
FIG. 1 shows an overview of a helmet tracking system, according to the present invention.

Referring to FIG. 1, a helmet tracker system (HTS) 100 is shown integrated with a helmet 102. The HTS 100 comprises a number of inertial sensors fitted to the shell of the helmet 106 and an optical helmet tracker system.

Each inertial sensor is in the form of an IMU 104 containing three gyros (gyroscopes), which are nominally orthogonal to one another. At least one gyro in one IMU is configured to measure a first parameter, and at least one gyro in at least one other IMU is configured to measure the same or equivalent parameter. Hence comparisons may be made between the gyros/IMUs.

In other embodiments the number of IMUs 104 and the number of gyros per IMU may vary. Provided there are three orthogonal gyros (e.g. X, Y and Z-axis aligned), the head position and orientation can be tracked, albeit with coasting errors. Provided there is some redundancy between the total gyros (e.g. there are four gyros two of which are aligned with one of the X, Y or Z axis) then comparisons can be made to help determine coasting errors.

The optical helmet tracker system comprises an arrangement of LEDs 110 integrated within or mounted upon the external shell of the helmet 106 and an arrangement of one or more cameras 112, each mounted at a fixed position in the vicinity of the helmet, e.g. within an aircraft cockpit or other vehicles, such they have a line of sight to at least some of the LEDs 110 at any likely orientation of the helmet 102. The invention is not limited to LEDs but instead is able to use any other appropriate light elements or markers.

In addition, instead of an optical tracker, it could be any tracking system that provides an absolute measurement of orientation that is compared with an inertia system.

An optical helmet tracker controller 114 is linked to each of the cameras 112 to receive image data resulting from the detection of light emitted by the LEDs 110 within the camera's field of View (FOV) and is also linked to the LEDs 110 in the helmet 102 such that it may control the illumination of the LEDs 110. The controller 114 is arranged, for example, to trigger a cyclic illumination of the LEDs 110 in predetermined patterns, to receive the resultant image data from the cameras 112. The controller 114 includes a digital processor programmed to illuminate the LEDs 110 and to interpret the resultant image data from the cameras 112 to determine helmet orientation and position relative to a frame of reference associated with a world stabilised and platform stabilised environment, such as an aircraft in this example.

A further processing module 116 is provided to receive the orientation and position data from the controller 114 from the helmet-mounted gyros (IMU) 104 and to convey world stabilised and platform stabilised image data received from an platform-installed image generation system (not shown), via an interface 118, to a helmet-mounted display (not shown) integrated within the helmet 102. The helmet-mounted display system may be a visor-projection display system, or a waveguide-based display, arranged in either case to present virtual images to the pilot such that they appear overlain upon the pilot's view through a visor of the helmet 102 of an external scene.

Figure 2:
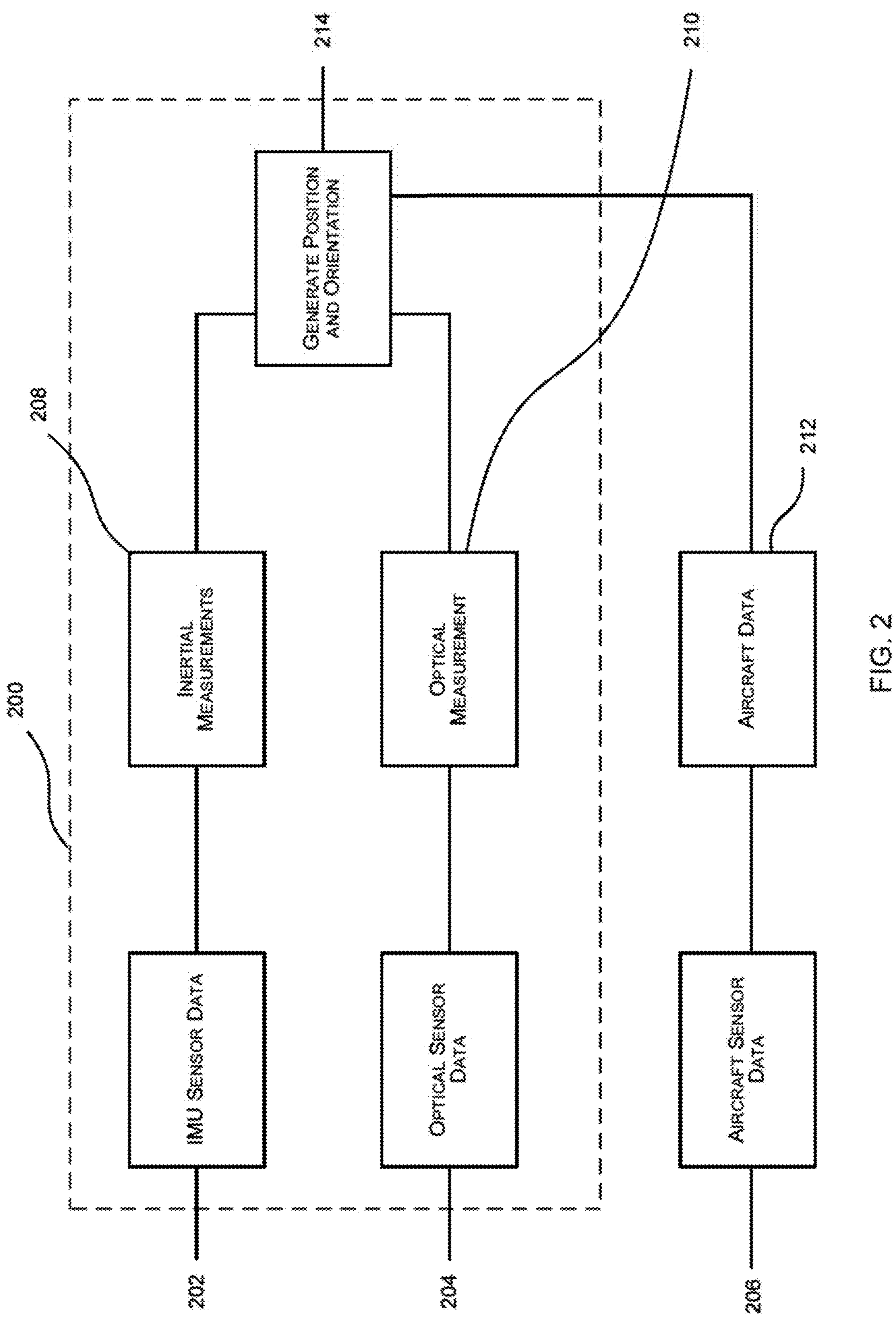
FIG. 2 shows a simplified block diagram of the FIG. 1 system.

FIG. 2 shows a block diagram of a hybrid HTS 200 for determining helmet orientation relative to a predetermined datum such as an aircraft cockpit. The HTS 200 receives sensor data from two or more helmet mounted IMUs (each IMU comprising three or more gyros) 202; an optical HTS 204 and an aircraft navigation system 206.

Each of the two or more IMUs 202 includes three miniature gyroscopes (gyros), each associated with a respective one of three nominally orthogonal gyro axes. The axes enable determination of yaw, pitch and roll. Each gyro is able to sense a rate of change in orientation of the system of helmet-mounted gyros 104 in inertial space, resolved along its respective gyro axis. The system can determine the rate of change in orientation of the helmet sensed by the individual gyros about their respective gyro axes. These are referred to as inertial measurements and are collected at 208.

The system provides that at least two gyros or at least two IMUs measure the same or an equivalent parameter such that comparisons can be made.

The optical HTS 204 includes the LEDs 110 on the helmet and the cameras 112 in the vicinity of the helmet as described in FIG. 1. The data collected by the cameras enables the exact position and orientation of the helmet to be identified in terms if XYZ positioning. These are referred to as optical measurements and are collected at 210.

The aircraft or platform navigation system 206 provides multiple types of information relating to the aircraft and the environment supplied by any relevant sensor used by aircraft to provide information. This is termed aircraft data and is collected at 212.

The combination of the IMU measurements, the optical measurements and optionally the aircraft measurements are used to determine the exact position and orientation of the helmet in space 214. The position and orientation are used to determine how to present images to the pilot. The images being a combination of real world images and virtual images, such as symbology or the like. The real world images come from the view seen by the pilot. The virtual image is based on sensor data relevant to the operation and circumstance of operation of the platform or vehicle. This may be combined and presented to the pilot. The presentation of certain virtual images (such as compass headings or other symbology anchored to external objects) is based on the position and orientation of the user or operator which is provided by the HTS 200.

The HTS 200, as previously stated, is a hybrid system and ideally combines optical and inertial measurements. Depending on head position and location, optical measurements are sometimes unavailable, and the system continues by using the inertial measurements only. During inertial only tracking, the system is reliant on the correct operation of the inertial measurement unit (IMU). In addition, when inertial only tracking the error will slowly increase with time due to the intrinsic characteristics of IMUs and external factors.

As a result there is a potential safety risk in relying on the inertial only tracking data. The correct functioning of the IMU and the build-up of error with time needs to be checked in real time.

Figure 3:
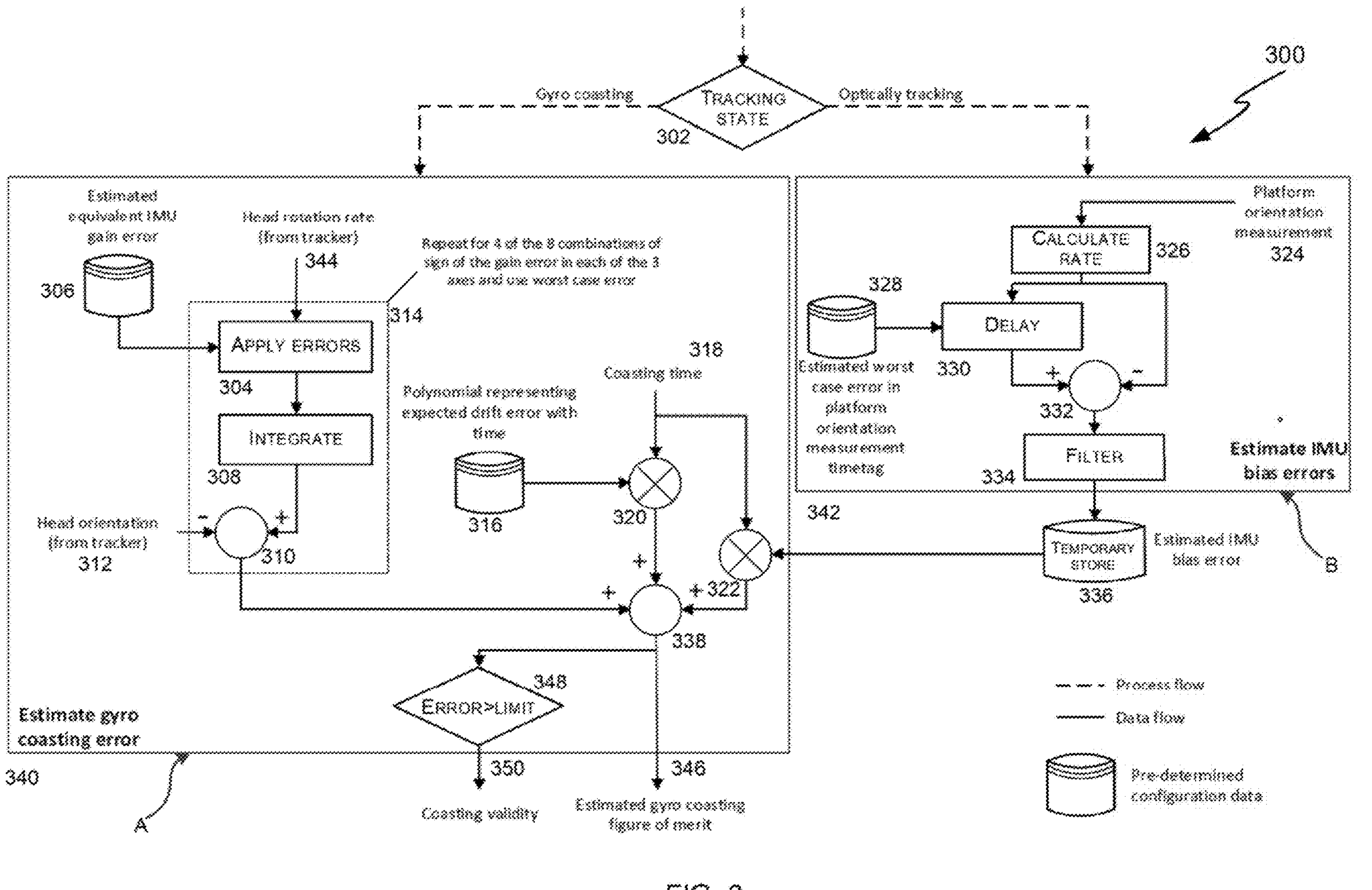
FIG. 3 shows a block diagram of a coasting error model according to the present invention.

The coasting error tracking model 300 will now be described with reference to FIG. 3. It should be noted that the tracker uses three orthogonally mounted gyros contained in an IMU however in some places this may be referred to a single gyro or rate.

The HTS 200 continually runs through a measurement cycle. For each cycle the optical section of the HTS takes a set of measurements, and the inertia section of the HTS takes a set of IMU measurements (consisting of three sets of data for each of the three orthogonal gyros). Note in practice, the optical section may run at a sub-rate of the inertia section, producing continual short gyro coasting.

If an optical solution cannot be calculated, i.e. insufficient data is collected to generate a solution, the HTS can only use IMU measurements. This results in a state referred to as gyro coasting.

If an optical solution can be obtained, then the tracker updates the estimate for the bias of the gyros block A. A certain amount of valid historical data is required, to be able to correctly calculate an angular rate from angular output data. In order to compare the gyro rate (in inertia space) with the optical tracker (platform space) the angle of the platform 324 (in inertia space is required. The aircraft angular measurements will typically be taken at a different time, this difference is compensated for by using, e.g., timestamps and suitable temporal adjustment. Under dynamic conditions, any temporal error in the aircraft measurement timestamp will cause an error in the estimated bias. Block A estimates this error if there is optical tracking using the platform orientation data 324 and a calculated rate 326.

A delay 330 is added to the platform orientation data rate 326 by an amount equal to the estimated platform measurement timestamp error 328. Error 328 is the estimated worst case error in platform orientation measurement time-tag.

A difference 332 is determined between the rate 326 and the delay rate 330.

A filter 334 is applied based on filter that is used in a core tracker algorithm that filters the gyros biases estimates. Typically, the filter in the core tracker removes noise. The output of the filter 334 is an estimate of IMU bias error and is stored in temporary storer 336. When there is no optical solution and coasting is operating the estimated IMU bias error will not be updated.

In block A an estimate of the gyro coasting error is determined. As previously mentioned during coasting, the gyro only data is used. This is effectively integrated to produce an orientation. The error build-up during coasting is a combination of one or more of the errors in the estimated gyros biases, the random drift and noise of the gyros and the gyro gain and alignment errors.

The effect of the errors caused by gyro biases errors is estimated by using the estimated error in the gyro biases 336 and multiplying this by the time the system is gyro coasting 318 to produce a value 332.

An error 320 due to the random drift and noise of the gyros is determined by using a polynomial 316 which represents the expected orientation drift as a function of time and feeding the polynomial with the time the system is gyro coasting. The coefficients of the polynomial are calculated offline based on measurements of a sample set of gyros combined with an error model of the core tracker system.

The error due to the gain and alignment (including intrinsic and extrinsic) errors of the gyros is calculated by using the head rotation rate 344 which is calculated by the core tracker system and generated from the corrected gyro measurements corrected for bias, gain, and alignment. Thereafter errors are applied 304 based on a gain error 306. The gain error 306 is applied in a particular direction (+ or −) for each of the three gyros. This gain error is calculated offline and represents the estimated equivalent gain error representing the error in calibrating the gyro gains, and alignment errors.

The rates are integrated 308. The angular difference between the orientation as calculated by the core tracker is calculated 312. The difference 310 between orientation 308 is the estimated gyro coasting error due to the gyro gain and alignment errors. If the estimated equivalent IMU gain error 306 is zero, then there the difference 310 would be zero.

The above steps 304, 308 and 310 are repeated 314 for four combinations of the sign directions. Note there are three gyros, each can have + or − an error, making eight in total, however two sets of four are the same apart from a sign, making four combinations in total. The algorithm uses the square of the error value, thus the sign is eliminated (this is not shown in FIG. 3).

The difference 310 due to gyro gain and alignment errors, the error 320 due to the random drift and noise of the gyros and the error 332 due to an error in the estimated gyros biases are added to estimate the total gyro coasting error 338 and generate an estimate gyro coasting figure of merit (FOM) 346. In parallel the total gyro coasting error 338 is compared to an error limit 348 and if less a flag is generated indicating gyro coasting is valid 350.

It is noted that there are many measurements made to accumulate data for determining the various types of error. These include but are not limited to one or more of the following:

Time since last optical measurement.
Head angle difference from loss of optical track
Platform angle difference from loss of optical track.
Number of IMUs.
Performance of the IMU, for example noise and stability.
Gyro scaling error.
Gyro misalignment (with respect to optical axes)
Gyro non-orthogonalities.
Gyro scaling temperature coefficient
Temperature variation
Bias filter constant
Unknown aircraft latency.
Maximum aircraft rotation rates.
Earth rotation rates (if not compensated for).
Aircraft latitudes and longitudes.

Figure 4:
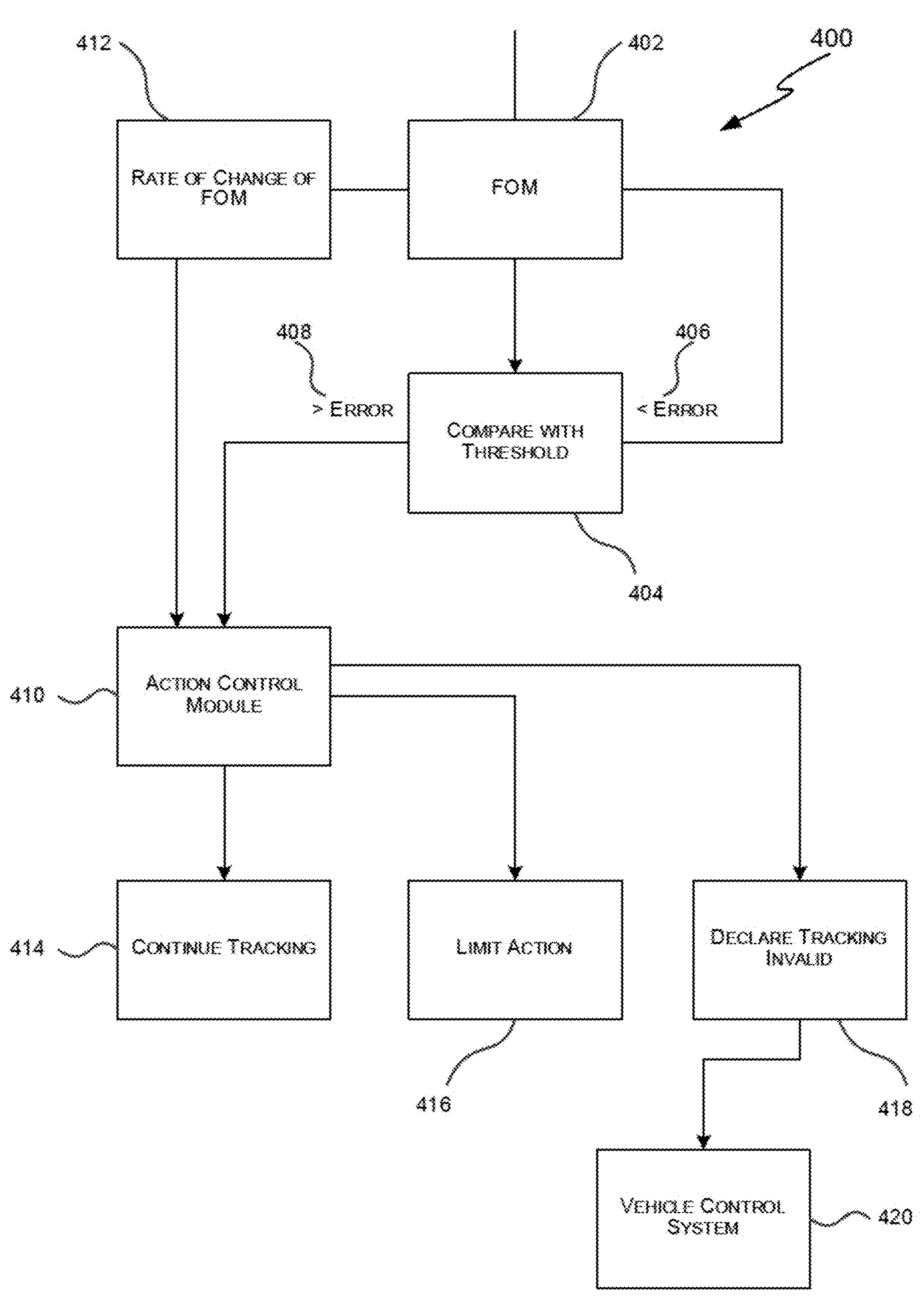
FIG. 4 is a block diagram for handling figure of merit (FOM) values according to the present invention.

The FOM is determined and used by the HTS to control future actions as will be described below with reference to FIG. 4.

The HTS may also include a sub system 400 which is used to monitor the FOM and make decisions on what actions are permissible and which are not based on the FOM. The FOM 402 is determined as has been described above.

The FOM value is also assessed to determine the rate of change of FOM 412. This is also passed to the action control module 410.

The action control module is used to assess the FOM and in some situations the rate of change of FOM 412, each will be described in detail below.

The action control module compares the FOM with a plurality of acceptable levels each relating to an action or task that could be performed by the user and generates a plurality of validity flags. For example there are tasks that do not need accurate position or orientation details which could continue normal operations 414.

The FOM can be derived from one or more error estimates associated with the tracking system. These errors are based on errors in the bias of sensors, drift errors, noise errors, sensor gain errors, alignment errors and aircraft related error associated with latency, acceleration and any other errors which might influence the inertial tracking.

There are other tasks which rely heavily on the correct orientation data The action control module determines which subsequent operations are available from a plurality of possible subsequent operations. The possible subsequent operations include any operation which might be taken by an operator or automatically by a vehicle system. The possible subsequent operations are accessible from a look-up table, a database are any other appropriate device or method.

The action control module also receives a rate of change of FOM 412 over time. This is processed to determine trends in any changes to the FOM. In response to certain changes the action controller module can take similar steps in relation to subsequent or future actions of the HTS. For example, by using the current value of the FOM and the rate of change of the FOM, the HTS can informed an external system that the FOM is about to reach a critical value and provide an estimated time until gyro coasting becomes invalid. If the rate of change is very small the HTS is likely to be operating in a stable manner (whether that is a valid or invalid operation). This will enable the external system or user to act before an invalid FOM is declared.

By combining the actual FOM and the rate of change of FOM, the error related risk of providing inaccurate information to the user, via for example symbology, is significantly mitigated. In addition each alone can contribute to performance improvements.

Figure 5:
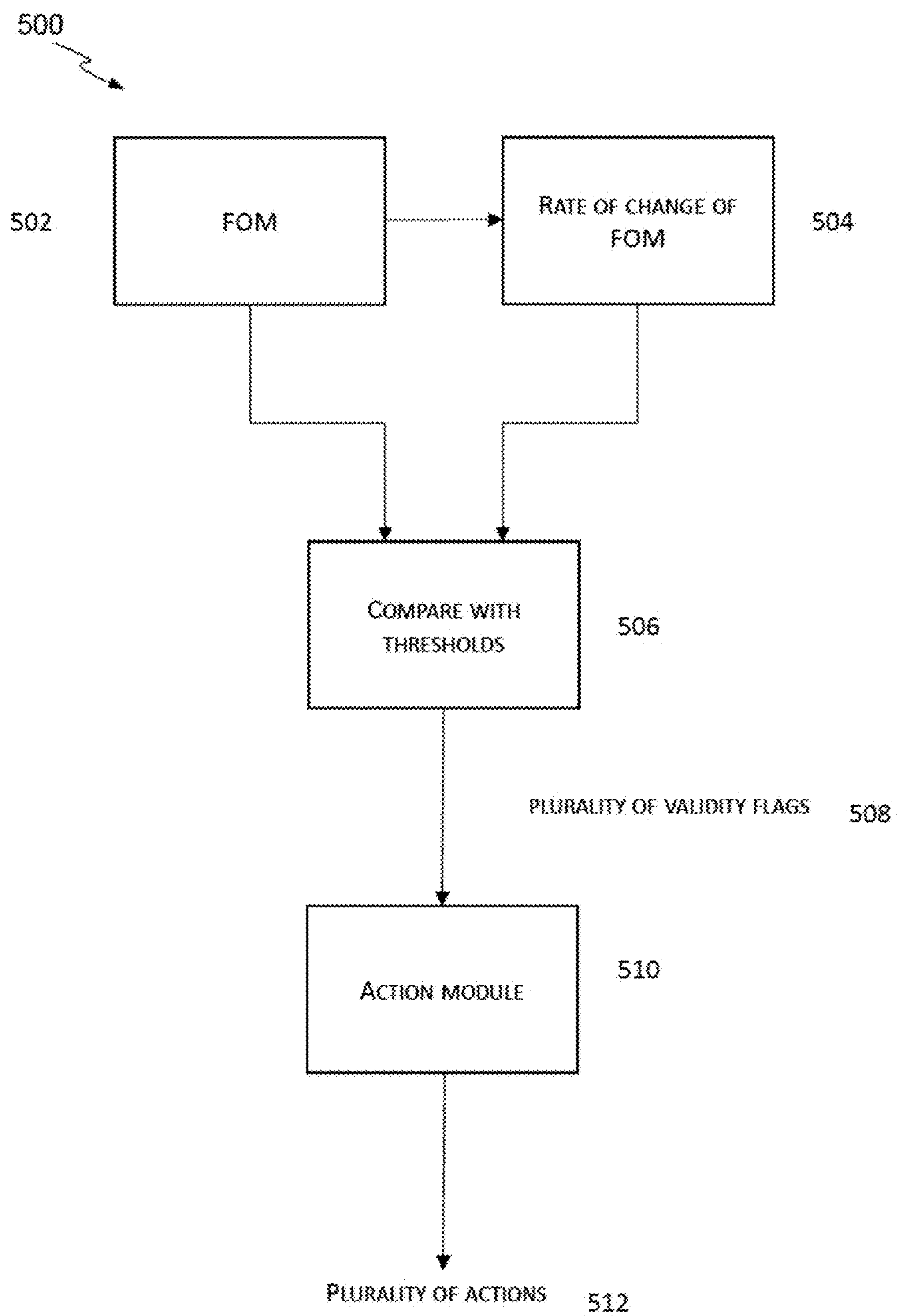
FIG. 5 is a simple block diagram for further FOM values according to the present invention.

Referring to FIG. 5 an example 500 of this is shown. The actual FOM is determined 502 as is the rate of change of FOM 504. The combined value of each is compared to a threshold 506. This generates a plurality of validity flags 508 which are passed to the action module 510 to initiate a plurality of actions 512. The actions generally affect how the data is used by an external system and compare with thresholds and/or action module could be part of either an external system or an internal element of the HTS.

In all cases the action controller module is determining which of the plurality of tasks are safe or unsafe based on the actual value of the FOM. Depending on the level of risk some tasks continue, some are limited, or the tracking is declared to be definitively invalid, and the system has to seek to recover tracking in an appropriate manner.

The FOM could be generated to allow the system to selectively control the presentation of information dependent on the accuracy required for that particular symbology. As mentioned above different types of symbology are enabled or not depending on the value of the FOM. The FOM may include different levels, for example 1, 2, 3. For each level associated symbology is suppressed from view due to the likelihood that the FOM is below a predetermined threshold for that particular symbology. If the threshold of the FOM is below the required level for the particular symbology a required safety threshold is not met and to use the particular symbology could lead to risks.

Accurate tracking as provided for here can enable systems to present symbology to the user at the right time and location in their field of view. In particular it can enable symbology to appear aligned or anchored to real world objects beyond the helmet. For example a virtual 'N' may hover over a northerly bearing, or a virtual waypoint marker may appear on a flight path, or a virtual ring may surround and thereby highlight a region of a dashboard. If an accurate head position and/or orientation cannot be determined, any presentation of symbology that is supposed to be anchored to real world objects can become misaligned, and thus may lead the user to errors and accidents.

Where symbology need not be aligned or anchored to an external real world object, it may continue to be presented regardless of whether accurate head tracking is possible. For example a digital odometer, could always be presented top left of the user's view, regardless of where the user's head was facing.

Symbology can Include at Least One or More of the Following:

Signs and symbols
Data from sensors.
Processed data from sensors.
Combinations of sensor data.
Military symbology
Platform related symbology.
Scene related symbology.
Location and positioning symbology
Map symbology
Speed and velocity symbology It will be appreciated the invention is as described above, but many variations and alternatives will be evident to the skilled person. The optical measurements could be replaced by any measurements that can be processed to provide an absolute measurement of position and orientation.

It will be appreciated that the above described invention could be altered to include different and equivalent features than those described, but that still fall within the scope of the claims.

The invention claimed is:

1. A head tracking system (HTS) comprising:
an optical sensor configured to produce an optical measurement;
an inertial sensor configured to produce an inertial measurement; and
a processor configured to operate in a coasting mode, when the optical sensor fails to provide the optical measurement for determining a head location of a user and/or a head orientation of a user, the coasting mode using the inertial measurement from the inertial sensor to determine the head location of the user and the head orientation of the user, the processor configured to
determine a figure of merit (FOM) for a coasting error based on a combination of an error in an estimated bias of the inertial sensor, an error due to random drift and noise of the inertial sensor, and an error due to gain and alignment errors of the inertial sensor,
compare the FOM with a threshold to determine whether the inertial measurement provides a valid or invalid head location and/or head orientation, and
determine a subsequent operation from a plurality of possible subsequent operations of the HTS based on whether the head location of the user and/or the head orientation of the user is valid or invalid.

2. The head tracking system according to claim 1, wherein when the coasting error is less than the threshold the head location of the user and/or head orientation of the user is valid.

3. The head tracking system according to claim 1, wherein when the coasting error is greater than or equal to the threshold, the head location of the user and/or head orientation of the user is invalid.

4. The head tracking system according to claim 1, wherein the HTS further includes an action control module to determine which subsequent operations are available.

5. The head tracking system according to claim 4, wherein the available subsequent operation comprises a normal operation when the head location of the user and/or head orientation of the user is valid.

6. The head tracking system according to claim 4, wherein the available subsequent operation comprises a limited operation when the head location of the user and/or head orientation of the user is invalid, and the operation does not need the head location of the user or the head orientation of the user.

7. The head tracking system according to claim 4, wherein the available subsequent operation comprises declaring tracking invalid when the head location of the user and/or head orientation of the user is invalid, and the operation does need the head location of the user or the head orientation of the user.

8. The head tracking system according to claim 1, wherein the processor is configured to:
determine the head position of the user and/or the head orientation of the user from one or both of the optical sensor and the inertial sensor;
determine the head position of the user and/or the head orientation of the user from the inertial sensor if the optical measurement is invalid;
determine the head position of the user and/or the head orientation of the user from the optical sensor if the inertial measurement is invalid.

9. The head tracking system according to claim 1, further configured to determine a rate of changes of FOM to identify trends and potential risks.

10. The head tracking system according to claim 1, wherein the inertial sensor is one of three or more gyroscopes located on a head worn assembly associated with the HTS.

11. The head tracking system according to claim 1, wherein the optical sensor is a camera in a vicinity of the HTS being configured to receive optical measurements from one or more light elements located on a head worn assembly associated with the HTS.

12. The head tracking system according to claim 1, further comprising an interface to receive aircraft orientation, aircraft position and associated latencies of the aircraft orientation and aircraft position data which is used in calculating the FOM.

13. The head tracking system according to claim 1, incorporated into a head worn display assembly such as a helmet.

14. A head worn display assembly configured to present real and virtual images to a user based on a head position and a head orientation provided by the HTS of claim 1.

15. The head worn assembly of claim 14, further including an optical display to display the real and virtual images to a user wearing the head worn assembly, wherein the presentation of at least the virtual images is based on the FOM of the inertial measurement.

16. The head worn assembly of claim 14, wherein the optical display comprises at least one of a visor-projection display system, and a waveguide-based display, arranged to present virtual images such that they appear overlain through a visor of the head worn display.

17. A method to determine a head location and a head orientation of a user to which real and virtual images are to be presented using a head tracking system (HTS) configured to produce optical measurements and to produce inertial measurements, the method comprising:
using, when optical measurements are unavailable, the inertial measurements to determine the head location and position;
determining a figure of merit (FOM) for coasting errors based on a combination of an error in an estimated bias of an inertial sensor that produces one or more of the inertial measurements, an error due to random drift and noise of the inertial sensor, and an error due to gain and alignment errors of the inertial sensor;

comparing the FOM with a threshold to determine whether the one or more inertial measurements provide a valid or invalid head location and/or head orientation; and determining a subsequent operation from a plurality of possible subsequent operations of the HTS based on whether the head location and/or head orientation is valid or invalid.

18. The method of claim 17, wherein determining the head location and/or head orientation is valid when the FOM is less than the threshold, and wherein determining the head location and/or head orientation is invalid when the FOM is greater than or equal to the threshold.

19. The method according claim 18, further comprising determining which subsequent operations are available via an action control module, further comprising one or more of:

determining the possible subsequent operation to be a normal operation when the head location and/or head orientation is valid, or the operation does not need the position or location of the user;

determining the possible subsequent operation to be a limited operation when the head location and/or head orientation is invalid, and the operation does not need the position or location of the user; and determining the possible subsequent operation to be declaring tracking invalid when the head location and/or head orientation is invalid, and the operation does need the position or location of the user.

20. The method according to claim 17, further comprising determining a rate of changes of FOM to identify trends and potential risks.

21. The method according to claim 17, further comprising notifying a vehicle control system when the FOM is invalid to enable the vehicle control system to reset head tracking.

* * * * *